(12) United States Patent
Roys

(10) Patent No.: US 9,581,294 B2
(45) Date of Patent: Feb. 28, 2017

(54) REPLACEABLE SLEEVES USED IN DISTRIBUTION BLOCKS

(71) Applicant: Curtis Roys, Kingsland, TX (US)

(72) Inventor: Curtis Roys, Kingsland, TX (US)

( * ) Notice: Subject to any disclaimer, the term of this patent is extended or adjusted under 35 U.S.C. 154(b) by 0 days.

(21) Appl. No.: 14/175,910

(22) Filed: Feb. 7, 2014

(65) Prior Publication Data

US 2015/0226376 A1    Aug. 13, 2015

(51) Int. Cl.
| F16N 25/02 | (2006.01) |
| F16N 25/00 | (2006.01) |
| F16J 10/02 | (2006.01) |
| F16J 1/09  | (2006.01) |
| F16J 9/12  | (2006.01) |
| F16K 11/07 | (2006.01) |
| F16K 27/04 | (2006.01) |

(52) U.S. Cl.
CPC .............. *F16N 25/00* (2013.01); *F16J 1/09* (2013.01); *F16J 9/12* (2013.01); *F16J 10/02* (2013.01); *F16K 11/07* (2013.01); *F16K 27/041* (2013.01); *Y10T 29/49238* (2015.01)

(58) Field of Classification Search
USPC ......................................................... 184/7.4
See application file for complete search history.

(56) References Cited

U.S. PATENT DOCUMENTS

| 2,143,733 | A | * | 1/1939  | Hillis ...................... | F16N 25/02 184/7.4 |
| 2,184,778 | A | * | 12/1939 | Hillis ...................... | F16N 25/02 184/6 |
| 2,345,370 | A | * | 3/1944  | Whann ................. | F04B 53/168 92/146 |
| 2,584,890 | A | * | 2/1952  | Leonard ................. | F16N 25/02 184/7.4 |
| 2,766,847 | A | * | 10/1956 | Harter ..................... | F16N 25/02 137/119.02 |
| 3,111,139 | A |   | 11/1963 | Beckett et al. | |
| 3,219,146 | A |   | 11/1965 | Leese et al. | |
| 3,298,460 | A |   | 1/1967  | Porter et al. | |
| 3,409,104 | A |   | 11/1968 | Acker et al. | |
| 3,422,926 | A | * | 1/1969  | Stanaway ............... | F16N 25/02 184/7.4 |
| 3,515,245 | A |   | 6/1970  | Obergefell et al. | |

(Continued)

OTHER PUBLICATIONS

Unknown, "Trabon MSP Modular Divider Valves," Greco, last accessed May 14, 2014.

*Primary Examiner* — John Fox
(74) *Attorney, Agent, or Firm* — Scheinberg & Associates, P.C.; Michael O. Scheinberg

(57) ABSTRACT

The invention is a distribution block assembly that contains replaceable sleeves and pistons that are suitable for use at high fluid pressures. The conventional distribution block assembly can be altered to include end plugs and these replaceable sleeves having designated precise quantity of lubricant distribution so that the user can alter the distribution levels by changing the replaceable piston/sleeves and allowing for users to fix excessively worn pistons without having to dissemble the entire distribution block. The use of these piston/sleeve assemblies transforming conventional distribution blocks making them more versatile and reducing the costly expense of manually replacing of the entire distribution block.

6 Claims, 8 Drawing Sheets

(56) References Cited

U.S. PATENT DOCUMENTS

| | | | |
|---|---|---|---|
| 3,586,129 A * | 6/1971 | Cass | F16N 37/003 |
| | | | 184/27.4 |
| 3,602,336 A * | 8/1971 | Downs | F16N 25/02 |
| | | | 137/853 |
| 3,664,462 A * | 5/1972 | Smith, Sr. | F16N 13/02 |
| | | | 184/29 |
| 3,756,274 A | 9/1973 | Wolfgramm | |
| 4,082,324 A | 4/1978 | Obrecht | |
| 4,105,094 A | 8/1978 | Callahan | |
| 4,312,425 A * | 1/1982 | Snow et al. | F16N 25/02 |
| | | | 184/7.4 |
| 4,392,551 A | 7/1983 | Buryakov et al. | |
| 4,502,567 A | 3/1985 | Karcher | |
| 4,572,331 A | 2/1986 | Powell et al. | |
| 4,895,192 A * | 1/1990 | Mortenson | F01M 11/04 |
| | | | 137/625.68 |
| 5,285,871 A | 2/1994 | Sievenpiper | |
| 5,297,426 A | 3/1994 | Kane et al. | |
| 5,605,179 A | 2/1997 | Strong, Jr. et al. | |
| D393,691 S | 4/1998 | Evans | |
| 5,810,115 A | 9/1998 | Mismas | |
| 5,835,372 A | 11/1998 | Roys et al. | |
| 6,085,783 A | 7/2000 | Hollingshead | |
| 6,850,849 B1 | 2/2005 | Roys | |
| 6,986,407 B2 | 1/2006 | Conley et al. | |
| 7,069,889 B2 | 7/2006 | Lechner et al. | |
| 7,096,889 B1 | 8/2006 | Roys | |
| 7,182,102 B2 | 2/2007 | Karcher | |
| D599,889 S | 9/2009 | Oshima et al. | |
| 8,555,927 B2 | 10/2013 | Roys | |

* cited by examiner

REPLACEABLE SLEEVES USED IN DISTRIBUTION BLOCKS

TECHNICAL FIELD OF THE INVENTION

The present invention relates to a distribution block assembly primarily for the distribution of precise quantities of lubrication.

BACKGROUND OF THE INVENTION

Historically, pistons in distribution blocks have not been replaceable. The accuracy and the exact specifications required to properly align the pistons in the distribution blocks deliver consistency, but when one of the pistons errs, there is currently no system that allows for the use to replace these pistons without having to replace the entire distribution block assembly. The reason for this is that during the manufacture of the distribution block, the preciseness that is required to distribute exact amounts of lubrication needs highly specific calibrations and the replacement of the traditional pistons have not been thought possible.

Additionally, because each distribution block is calibrated to deliver lubricant or fluids in a very specific quantity, when that quantity amount requires changing, the only current method is to change the entire distribution block. Allowing the replacement of different types of pistons for each sleeve allows the user to change the quantities delivered or rate of distribution of the fluid by only replacing the piston/sleeve combination and not replacing the entire distribution block.

For over forty years, these distribution blocks have not made much technological advances. For example, a lubricating system patent that was published in Jan. 27, 1953 shows a distribution block, (the term "distribution block" is to be used interchangeably with "distribution valve" and "distribution block" that is used in the industry) having U.S. Pat. No. 2,766,847 issued to Harter and assigned to Trabon Engineering Corp ("Trabon"). Trabon currently manufactures a distribution block that is very similar to technology that was developed in the mid-1900's. And a search in respective patent classification (both US and internationally) shows very little progress made in this field. FIG. 1 shows Trabon's patent figure showing the lubrication system and is marked as "prior art."

The current invention challenges the improbable ability to use replaceable pistons by introducing a replaceable piston/sleeve combination that carries with it the exact specifications that is required in the industry. This combination of piston and sleeve transforms the way current distribution blocks are made and used. By making the piston and sleeve replaceable, the repair time for a distribution block no longer requires the replacement of the entire distribution block, which requires several attachments and detachments from each of the inlets and outlets on the distribution block.

Industrial tools and machines, such as compressors, rely on proper lubrication, to ensure the proper operation and longevity of components. Without proper lubrication internal components risk serious damage. A "distribution block" allows pressurized lubricant to distribute to multiple lubrication points. This may also be known as a "divider valve." In a distribution block, the pressurized lubricant causes a set of pistons to move back and forth within the piston bores. The moving pistons open and close internal fluids channels, which allows the user to know the precise volume of fluid that is distributed in the multiple outlet channels. Common quantities of distribution of lubricant is 6, 9 12 15 18 21 24 in which the corresponding numbers indicate lubricant output in thousandths of a cubic inch. This piston sleeve combination allows the operator to immediately change the lubricant output of the distribution block to any quantity of lubricant needed, by a simple changing of the piston/sleeve combination. Because the pistons in the distribution block are powered by the pressure of the fluid being distributed, no additional source of power is necessary to operate the distribution block.

In the industry, a standard MJ distribution block is well known to provide lubricants to compressors. As shown in FIG. 3, a typical MJ series distribution block 300 consists of an inlet section 301 and three to eight valve sections 302. Each single section 302 can have an outlet on either side but the outlet on one side must be plugged for the section to operate properly. There are two manifold bolts 303, 304 that run from the top to the bottom through each of the distribution blocks. Each distribution block section 305 includes an internal piston (not shown) within a bore (not shown). The manifold bolts 303, 304 connect each of the distribution blocks 305. These blocks are held and sealed with gaskets between the inlet, ends, and between each block. Because these blocks are held together in multiple pieces, the amount of pressure that can be held in the valves is about 3500 PSI. During use, if any problems persisted in any of the blocks, the user was required to remove the tubing from the block. Then, the user had to remove the complete block assembly from the compressor, which was then followed by the user having to totally disassemble and replace any of the problem blocks. This type of assembly eventually led to the innovations of baseplates 306 and manifold bolts 303, 304.

As shown in FIG. 4, base plate section 306 includes internal channels (not shown) for fluid movement and holes for moving fluid between adjacent sections. Each base plate section 306 also includes an outlet (not shown) for dispensing the fluid, and holes for moving fluid in and out of the corresponding distribution block sections 305.

As shown in FIG. 5, outlet port in the valve section typically includes internal pipe threads so that an outlet pipe can screw directly into output port. Within a piston bore is positioned a piston. Pistons typically include two sections 404 of reduced diameter separating three sections 406 having a diameter that just fits within bore 400. Fluid can readily pass around sections 404, whereas fluid does not readily pass around sections 406, thereby allowing fluid pressure to move piston 402. The piston clearance within a piston bore is typically designed to be about 0.0003 inches (three ten-thousandths of an inch). A plug 408 is shown at one end of the bore 400. Bolt holes 410 are used for passage of bolts that connect distribution block section 402 to an intermediate base section, and indicator ports 412 are used to allow oil to either pass through the port from passage 414 or to be exposed in the port for trouble shooting purposes.

However, the difficulty of fixing these distribution blocks or changing the distribution rates of each piston have always required the replacement of the distribution block in its entirety, and the embodiments of the current invention allows for a system so that the user does not have to replace the entire distribution block.

SUMMARY OF THE INVENTION

An object of the invention is to provide a divider block that can be repaired instead of needing to be replaced.

The embodiments of the current invention disclose a replaceable piston/sleeve assembly that acts as the pistons within the distribution block system. By adding this replaceable sleeve to the current distribution block system, there is no need to dissemble the distribution blocks upon failure. The replaceable piston/sleeve can be exchanged without having to take off the distribution block from the baseplate.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF THE PREFERRED EMBODIMENTS

The present invention incorporates replaceable sleeves and pistons that enable the transformation of any traditional distribution block into a transformer block, or in other words, a distribution block with replaceable piston capabilities. The transformer block enables the operator to replace pistons in each individual distribution block section.

Figure 1:
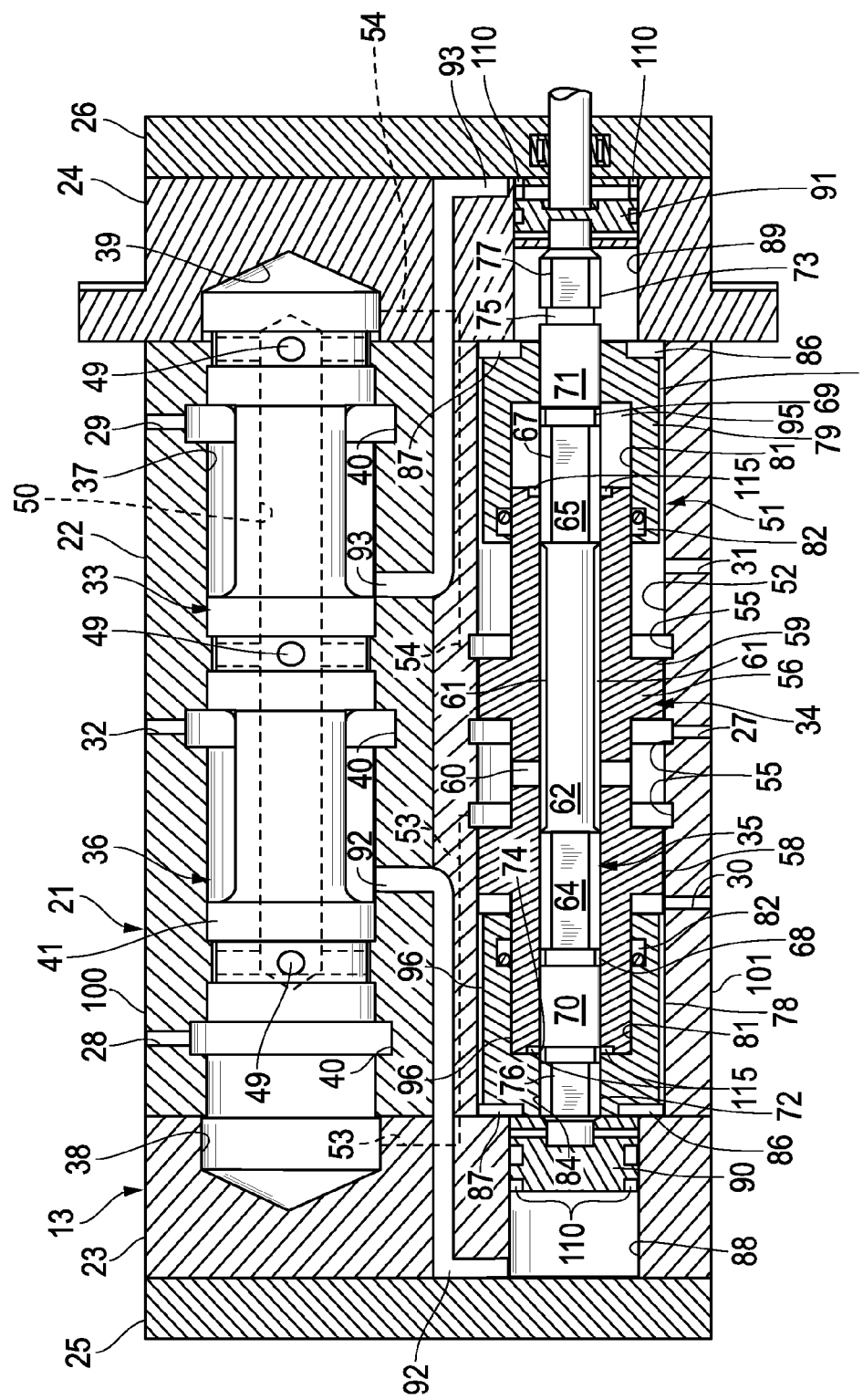
FIG. 1 is a perspective view of a prior art distribution block.
Figure 2:
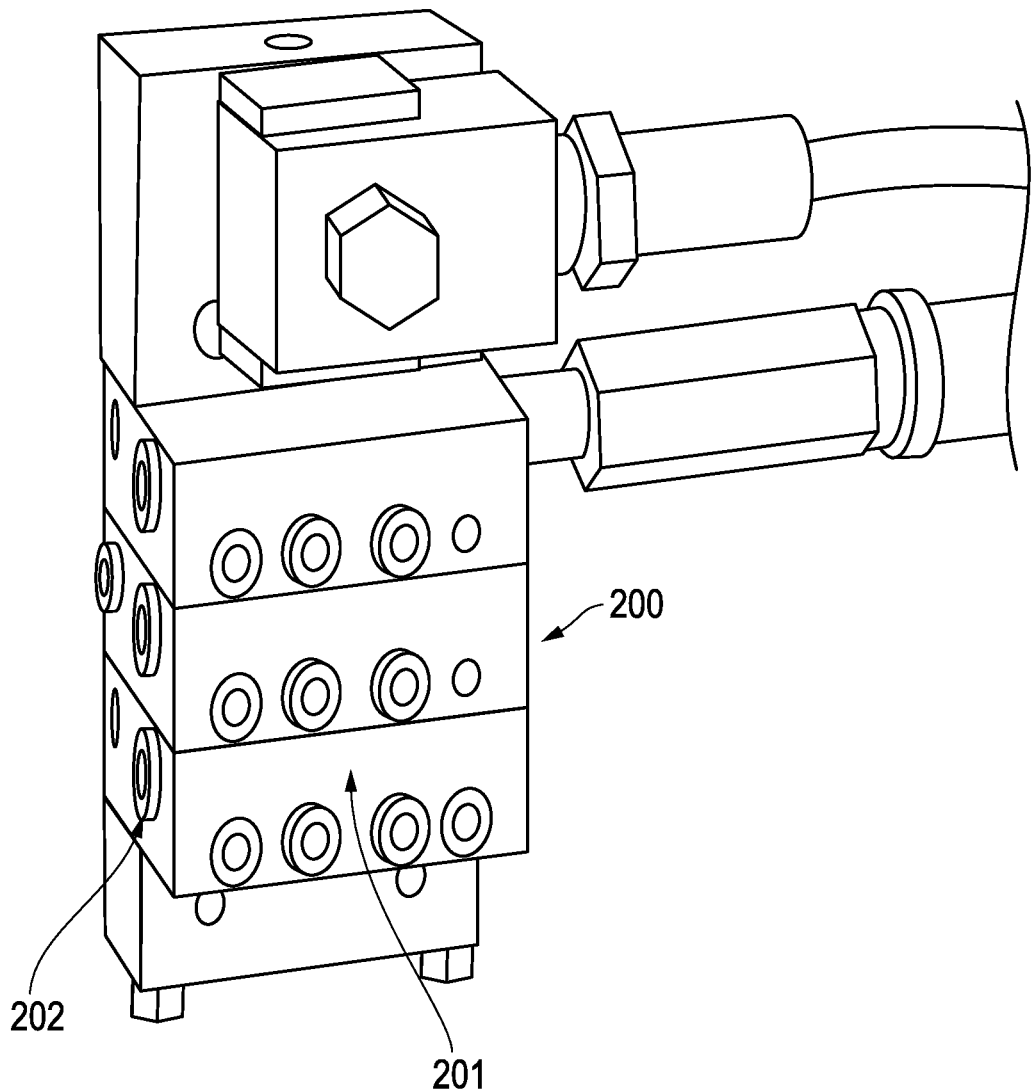
FIG. 2 is a perspective of a more recent prior art distribution block.
Figure 3:
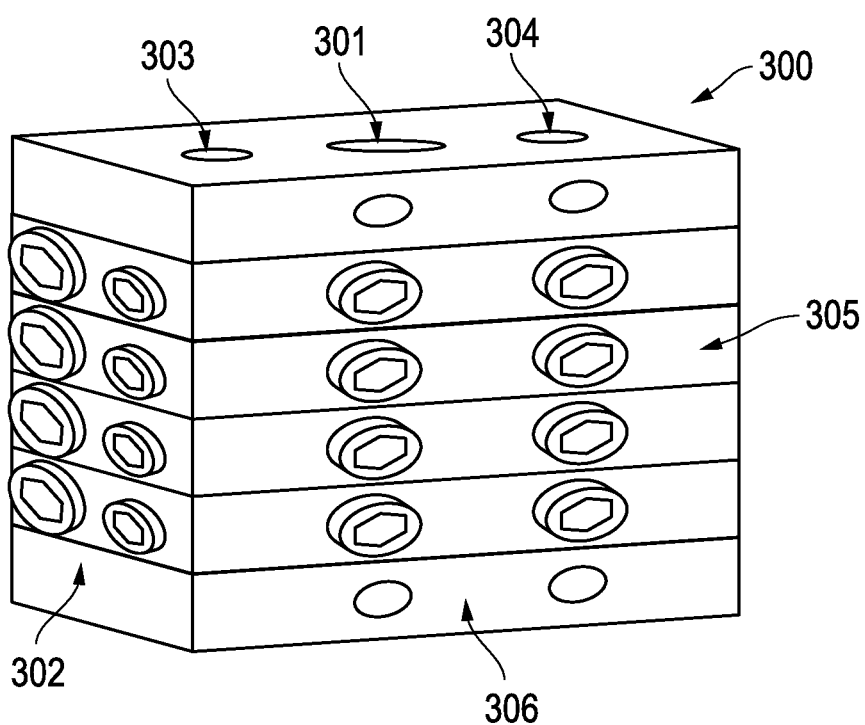
FIG. 3 is a standard MJ series distribution block in accordance with prior art.
Figure 4:
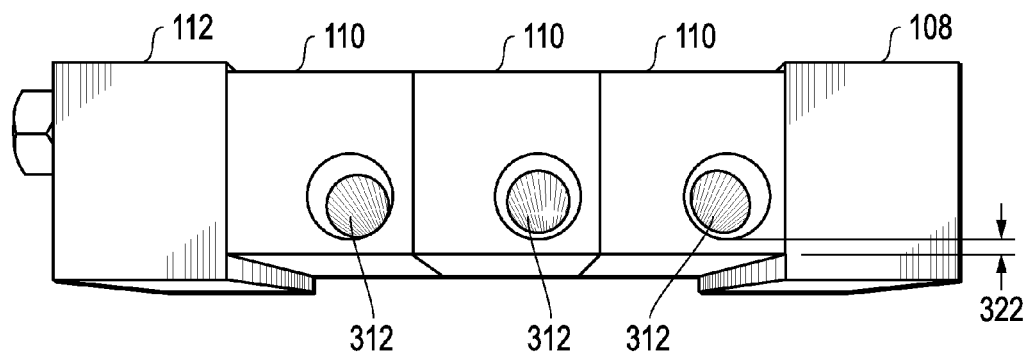
FIG. 4 is a side prospective of a distribution block showing the piston bores.
Figure 5:
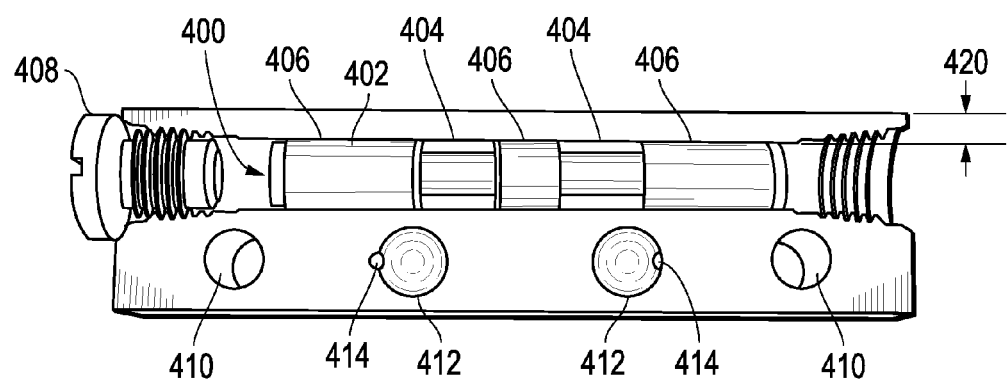
FIG. 5 is an X-ray perspective of a prior art piston assembly used in conventional distribution blocks.
Figure 6:
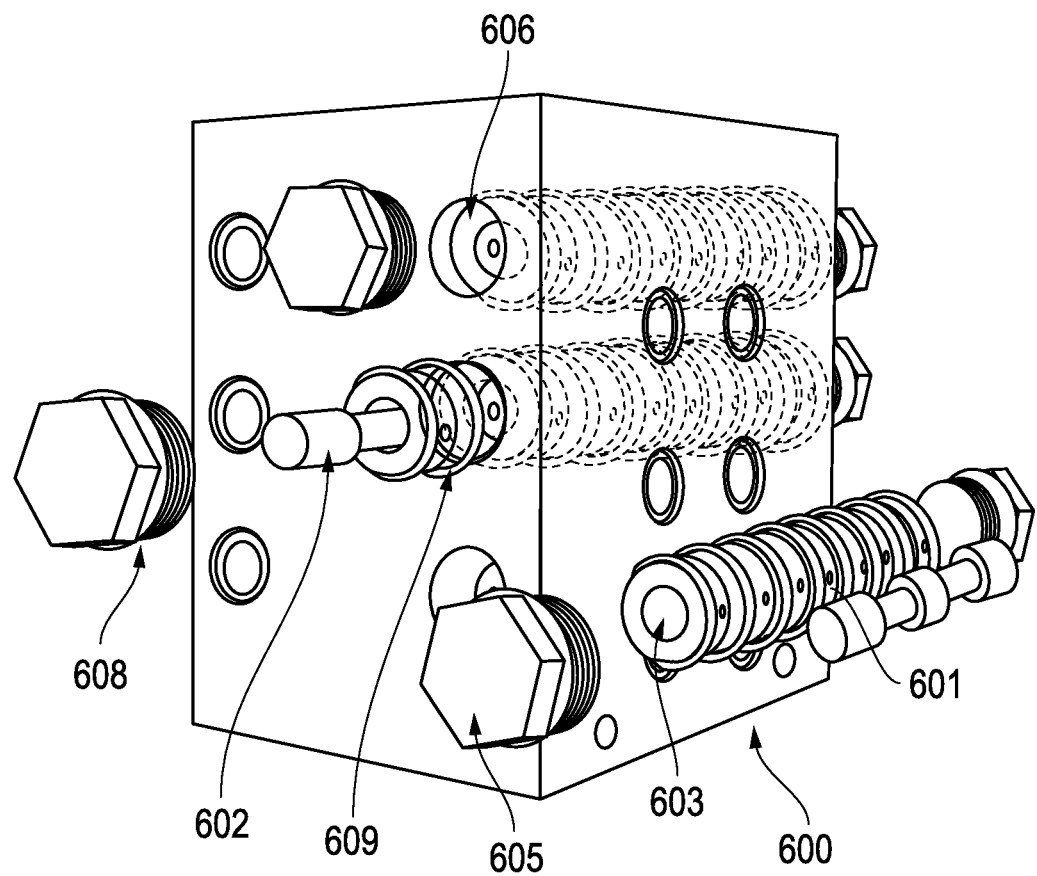
FIG. 6 is an X-ray perspective of the current invention in accordance with one of the current embodiments.

The current invention discloses replaceable piston/sleeve assemblies 601 in system 600 in FIG. 6.

Sleeves 601 that allows for the repair of the distribution block by replacing the piston/sleeve combination rather than the entire distribution block. Historically, industry standard distribution blocks were made so that they required disassembly and the installation of new distribution blocks and base plate. The current invention of the replaceable sleeves 601 with replaceable pistons 602 that it so that no disassembly and reassembly are necessary.

The configuration of the sleeve 601 allows for the user to replace only the internal piston and not the complete distribution block. This not only enables the operator to easily change the piston but also reconfigure the output capacities of each individual piston by simply replacing different piston/sleeve assemblies. The invention reduces the inventory of manufacturers as well as the inventory of the end user. With the introduction of the present invention all distribution blocks will be a standard configuration for lubrication feeds. The only changes to the complete assembly will be the size of the replaceable pistons, which can vary according the needs of the user. The quantities of fluid delivered by each piston can come in quantities of 6, 9 12 15 18 21 24 in which the corresponding numbers indicate lubricant output in thousandths of a cubic inch. This piston sleeve combination allows the operator to immediately change the lubricant output of the distribution block to any quantity of lubricant needed. Each piston is laser engraved on each end with a number that indicates the lubricant output of the piston, i.e., a piston marked with a 12 on the end of the piston indicates the output of that piston is 0.012 thousandths of a cubic inch of fluid.

The replaceable sleeves 601 that are calibrated precisely to hold and align pistons 602 within its body. The sleeves 601 and the pistons 602 allow for the interchangeability of these components without having to dissemble any of the modular sections. In the past, when any of the pistons proved faulty, the whole distribution block required disassembly and reassembly with a new distribution block. The current invention allows a user to interchange any of the sleeves and pistons without having to disconnect tubing lines and tube fittings from the distribution block or dissemble the distribution block. The sleeves 601 enter the piston bore 603. The sleeves are lined with a set of O-rings 604 to stabilize and seal and separate the hydraulic circuits and the sleeves in the distribution block bore.

FIG. 6 shows a close-up model of sleeve and piston system 600. Sleeve 601 is configured to fit pistons 602 in a precise fit. The manufacture of these materials can be steel or alloy as discussed above regarding the body of the transformer-block. The sleeve is sized to fit within the distribution block bore 603. Once positioned inside the channel of the distribution block bore 603, the sleeve sits comfortably on a bed of O-rings 604. The transformer block uses the traditional distribution block O-rings to procure a seal between the distribution block and the base plate. This system allows the user to keep the existing base plate with replaceable piston/sleeve sections that make the seal with O-rings.

Based on these innovative features of sleeve 601, the sleeve system can transform traditional distribution block systems These replaceable sleeves 601 can in essence turn conventional distribution blocks that use conventional pistons and each piston/sleeve combination is designed and with specific sizes of pistons to allow the accurate output of lubricant capacity and honed scientifically to clear the sides of the walls by 125,000,000$^{th}$ of an inch. Thus, the difficulty of having just replaceable pistons has essentially been technologically impossible.

According to one embodiment of the current invention and FIG. 6, the user can remove and replace any conventional distribution block and replace it with a transformer distribution block. This will update the old style throwaway distribution block assembly into a new Transformer distribution block. Now when the piston in the Transformer distribution block becomes worn and begins to bypass, the end user will only need to replace the piston/sleeve assembly and will have a new accurate delivery of lubricant to protect the internal components. Then, the user can install the sleeve 601 into sleeve channels 606. The piston/sleeve 501 assembly comes with the lubricant preinstalled on the sleeve, so no lubricant is needed. According to one embodiment of the invention, the user then slides an O-ring compressor over the top of the sleeve 601 assembly and tightens a wing nut on the O-ring compressor (not shown). The user then slides the sleeve 601 into the end of the distribution block body until it sits firmly on the machined indention on the end of the distribution block body. Once that is finished, the user pushes on the end of the sleeve 601 assembly with the included wooden or brass rod until the sleeve 601 assembly bottoms out on the opposite end of the distribution block body.

A second O ring is sealed to the end plug and both end plugs replaced. The piston bore 603 houses piston 602.

Figure 7A:
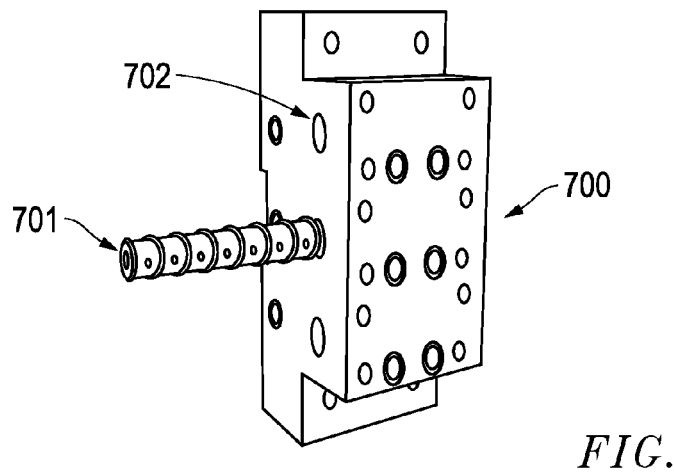
FIGS. 7A-7C are views showing the interchangeability of each of the pistons.
Figure 7B:
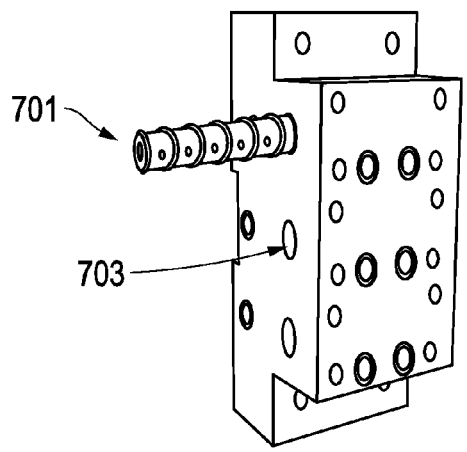
Figure 7C:
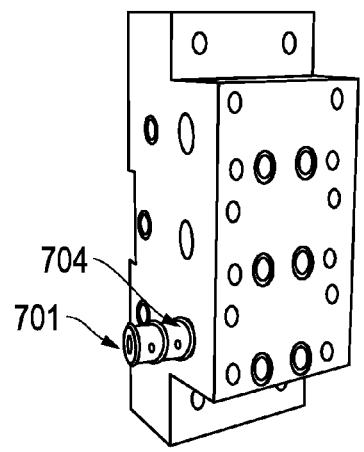

FIGS. 7A-7C show how sleeves 701 are interchangeable even within its own system 700. Sleeve 701 fits within piston bore 702, 703, and 704. The interchangeability of these sleeves proves to have beneficial results that far exceeded performance expectations when compared to other similar technology. Unlike previous systems that required the replacement of the whole system during repairs, users are now only required to open the piston bore and replace the piston/sleeve assembly that has a fitted piston. This far reduces time, cost and efficiency of a production line and field replacement.

In an industry that currently removes and disposes the distribution blocks when the pistons become worn and when pistons start to bypass, the current invention is less wasteful and less costly to the end user. The replaceable sleeves and pistons are estimated to cost 75% less to manufacture. Further, the disposal of the steel distribution blocks creates tons of waste steel that cannot be reused while replaceable sleeves and pistons would produce only a fraction of such waste.

Because these pistons and sleeves are replaceable, there are no gaskets and no O-rings (except for the O-rings that seal the end plugs). This allows for a much faster and efficient method of repairing the distribution block system In addition, the use of these replaceable piston/sleeves allows for the manufacture of only one size piston block housing, Prior to this invention, it was not thought of that a one piece block can be used because the pistons could not be replaced. All current industry standard distribution blocks used worldwide are disposable and cannot be reused or repaired.

Figure 8:
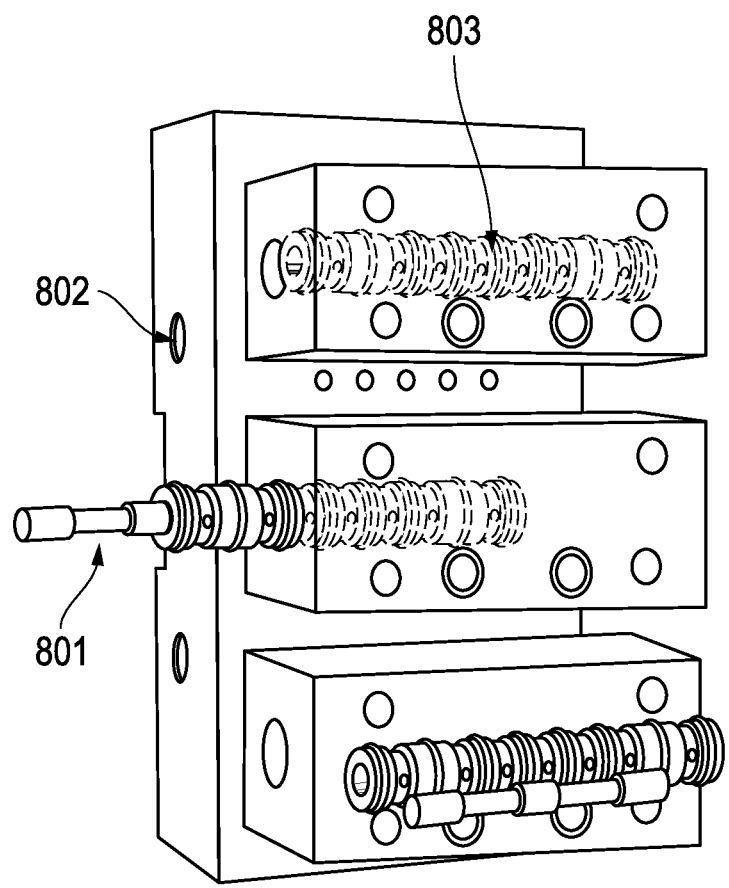
FIG. 8 is a front perspective of a transformer block according to one embodiment of the current invention.

FIG. 8 is a different view of the innovative replaceable piston/sleeve system. The replaceable piston/sleeve 801 can be used in place of conventional distribution blocks to transform conventional distribution blocks into a fully integrable system with interchangeable parts. Even with interchangeable parts, these blocks allows for about 10,000 PSI of operating pressure due to the reduced stress strain expansion. At most, the current multiple distribution blocks allow for about 3500 PSI. The stainless steel sleeve 801 has a precise center cavity 801 that enables the piston to be hone fitted to tolerances of 80 millionths of an inch. The sleeve 801 sits precisely within the distribution block bore resting on a number of O-rings 802. As shown in FIG. 6, the end plug 607 and tightener 608 allows for the proper alignment of the piston/sleeve 601 assembly using the alignment rings on the outside of the sleeve 609.

In the following discussion and in the claims, the terms "including" and "comprising" are used in an open-ended fashion, and thus should be interpreted to mean "including, but not limited to . . . . " To the extent that any term is not specially defined in this specification, the intent is that the term is to be given its plain and ordinary meaning. The accompanying drawings are intended to aid in understanding the present invention and, unless otherwise indicated, are not drawn to scale.

Figure 9:
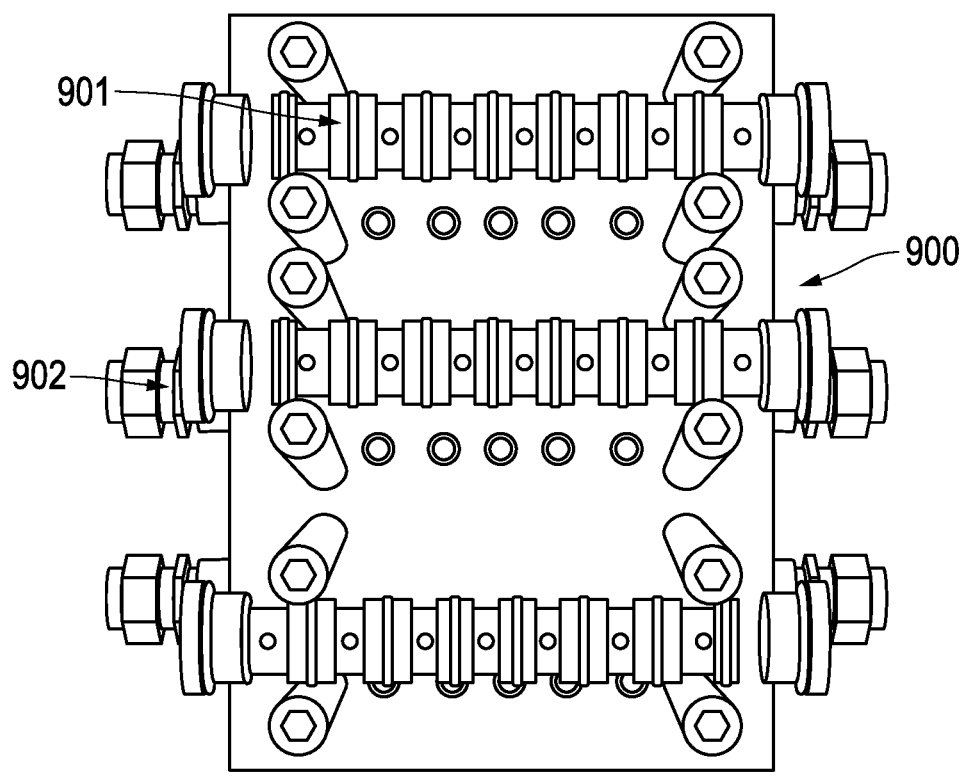
FIG. 9 is another front perspective of a transformer block according to one embodiment of the current invention.

FIG. 9 shows a system 900 in accordance with one embodiment of the current invention wherein the alignment of the sleeve is aided by both the circling aligning rings 901 and the end plug 902.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A replaceable piston/sleeve system used in a distribution block assembly for distributing a low volume of a lubricant at high pressure, the system comprising:
    a distribution block having at least one inlet section, an end section, and one or more intermediate sections, each intermediate section including a lubricant outlet and a piston bore connected to the lubricant outlet, and a base plate connected together with one or more bolt fasteners; and
    at least one replaceable piston/sleeve assembly constructed as a combination to be removed together as a replaceable assembly and sized to fit the piston bore of a selected intermediate section, said replaceable piston/sleeve assembly having a sleeve calibrated to hold and align a piston of a selected size to reciprocate within the sleeve while positioned within the distribution block wherein the piston delivers an accurate quantity of lubricant to the outlet such that the rate of distribution of the lubricant is determined by the size of the piston, the sleeve having multiple O-rings disposed on its outer periphery and along its length to stabilize the sleeve within its associated piston bore and to define a fluid path with the distribution block; wherein the piston/sleeve assembly is interchangeable with a piston bore of each intermediate section.

2. The replaceable piston/sleeve system of claim 1 wherein the pressurized lubricant causes the piston to move back and forth within the sleeve.

3. The replaceable piston/sleeve system of claim 2 wherein the moving piston opens and closes internal fluid channels, which allows precise volume of fluid to be distributed.

4. The replaceable piston/sleeve system of claim 1 wherein the piston is sized to distribute a fixed amount of fluid or lubricant to the lubricant outlet.

5. The replaceable piston/sleeve system of claim 4 wherein the piston/sleeve assembly is replaceable with another piston sleeve assembly having a piston with a different selected size to produce a different distribution rate.

6. The replaceable piston/sleeve system of claim 1 including end plugs that properly align the sleeves within the piston bore so that the pistons are automatically calibrated.

\* \* \* \* \*